United States Patent
Ji et al.

(10) Patent No.: US 10,097,337 B2
(45) Date of Patent: Oct. 9, 2018

(54) DEVICE, SYSTEM, AND METHOD FOR SECONDARY CELL MEASUREMENT OPTIMIZATION

(71) Applicant: APPLE INC., Cupertino, CA (US)

(72) Inventors: Zhu Ji, San Jose, CA (US); Beibei Wang, Cupertino, CA (US); Johnson O. Sebeni, Fremont, CA (US)

(73) Assignee: APPLE INC., Cupertino, CA (US)

( * ) Notice: Subject to any disclaimer, the term of this patent is extended or adjusted under 35 U.S.C. 154(b) by 69 days.

(21) Appl. No.: 15/178,952

(22) Filed: Jun. 10, 2016

(65) Prior Publication Data
US 2017/0359160 A1    Dec. 14, 2017

(51) Int. Cl.
| | |
|---|---|
| *H04L 5/14* | (2006.01) |
| *H04W 72/04* | (2009.01) |
| *H04W 16/32* | (2009.01) |
| *H04L 5/00* | (2006.01) |
| *H04L 12/26* | (2006.01) |
| *H04W 88/02* | (2009.01) |

(52) U.S. Cl.
CPC .............. *H04L 5/14* (2013.01); *H04L 5/006* (2013.01); *H04L 43/16* (2013.01); *H04W 16/32* (2013.01); *H04W 72/042* (2013.01); *H04W 72/0446* (2013.01); *H04W 88/02* (2013.01)

(58) Field of Classification Search
CPC ........... H04L 5/14; H04L 5/006; H04L 43/16; H04W 16/32; H04W 72/042; H04W 72/0446; H04W 88/02
See application file for complete search history.

(56) References Cited

U.S. PATENT DOCUMENTS

| | | | |
|---|---|---|---|
| 2013/0017797 A1* | 1/2013 | Ramasamy | H04B 7/0814 455/226.1 |
| 2015/0189610 A1* | 7/2015 | Siomina | G01S 5/021 370/280 |
| 2015/0230112 A1* | 8/2015 | Siomina | G01S 5/0205 370/252 |
| 2016/0295636 A1* | 10/2016 | Yang | H04B 7/0413 |
| 2016/0302228 A1* | 10/2016 | Kazmi | H04L 1/1887 |
| 2017/0171768 A1* | 6/2017 | Kim | H04W 76/048 |

FOREIGN PATENT DOCUMENTS

| | | |
|---|---|---|
| WO | 2014/112920 | 7/2014 |
| WO | 2015/117266 | 8/2015 |

* cited by examiner

*Primary Examiner* — Walli Butt
(74) *Attorney, Agent, or Firm* — Fay Kaplun & Marcin, LLP

(57) ABSTRACT

A method and device are described that may be implemented by a user equipment (UE) that established a first connection to a first network component, the user equipment configured to establish a second connection with a second network component, the user equipment configured for a carrier aggregation functionality, the first network component serving as a primary serving cell (PCell) and the second network component serving as a secondary serving cell (SCell). The method may include determining a cycle comprising a first time when a SCell measurement is performed and a remainder second time, when the cumulative first and second times is less than a threshold cycle time, determining an interruption opportunity based on activity between the UE and the PCell and when the interruption opportunity is determined, deactivating a radio frequency (RF) chain associated with the SCell during the second time.

20 Claims, 4 Drawing Sheets

US 10,097,337 B2

DEVICE, SYSTEM, AND METHOD FOR SECONDARY CELL MEASUREMENT OPTIMIZATION

BACKGROUND INFORMATION

A user equipment (UE) may be configured to establish a connection with a network. For example, the UE may be a mobile device and utilize a wireless communications protocol. The UE may exchange data with the network directly and/or with other end devices through the network. Specifically, the UE may associate with a network component which serves as a primary serving cell (PCell). The PCell may control the manner in which the data is exchanged with the UE such as determining when uplink and downlink grants are given for the UE. The PCell may also control the mechanism used in exchanging data, particularly how data is transmitted to and received by the UE.

In a specific example, the PCell and the UE may be configured with a carrier aggregation functionality. The carrier aggregation functionality enables the PCell and at least one further secondary serving cell (SCell) to combine bandwidths to exchange data with the UE. Thus, with carrier aggregation, the PCell may provide a first portion of a total bandwidth for data to be exchanged while the SCell may provide a second portion of the total bandwidth. This carrier aggregation mechanism requires a higher amount of power use by the UE as further processes are used to achieve this greater rate of transmission. Even when the carrier aggregation mechanism is not being used, the availability of the carrier aggregation mechanism entails power usage, particularly in measuring a radio resource control (RRC) parameter of the SCell.

SUMMARY

Described herein is an exemplary method performed by a user equipment (UE) that established a first connection to a first network component, the user equipment configured to establish a second connection with a second network component, the user equipment configured for a carrier aggregation functionality, the first network component serving as a primary serving cell (PCell) and the second network component serving as a secondary serving cell (SCell). The method includes determining a cycle comprising a first time when a SCell measurement is performed and a remainder second time, when the cumulative first and second times is less than a threshold cycle time, determining an interruption opportunity based on activity between the UE and the PCell and when the interruption opportunity is determined, deactivating a radio frequency (RF) chain associated with the SCell during the second time.

Also described herein in an exemplary user equipment having a transceiver configured to enable the user equipment to establish a first connection with a first network component and a second connection with a second network component, the transceiver configured for a carrier aggregation functionality, the first network component serving as a primary serving cell (PCell) and the second network component serving as a secondary serving cell (SCell) and a processor. The processor is configured to control an operation of the transceiver by determining a cycle comprising a first time when a SCell measurement is performed and a remainder second time, when the cumulative first and second times is less than a threshold cycle time, determining an interruption opportunity based on activity between the UE and the PCell and when the interruption opportunity is determined, deactivating a radio frequency (RF) chain associated with the SCell during the second time.

Further described herein is an integrated circuit having timing circuitry configured to determine a cycle comprising a first time when a secondary serving cell (SCell) measurement is performed and a remainder second time, the SCell being part of a carrier aggregation functionality with a primary serving cell (PCell), the PCell being served by a first network component, the SCell being served by a second network component and processing circuitry configured to set a status of a radio frequency (RF) chain associated with the SCell, wherein, when the cumulative first and second times is less than a threshold cycle time, determining an interruption opportunity based on activity between the UE and the PCell, and wherein, when the interruption opportunity is determined, deactivating a radio frequency (RF) chain associated with the SCell during the second time.

DETAILED DESCRIPTION

Figure 1:
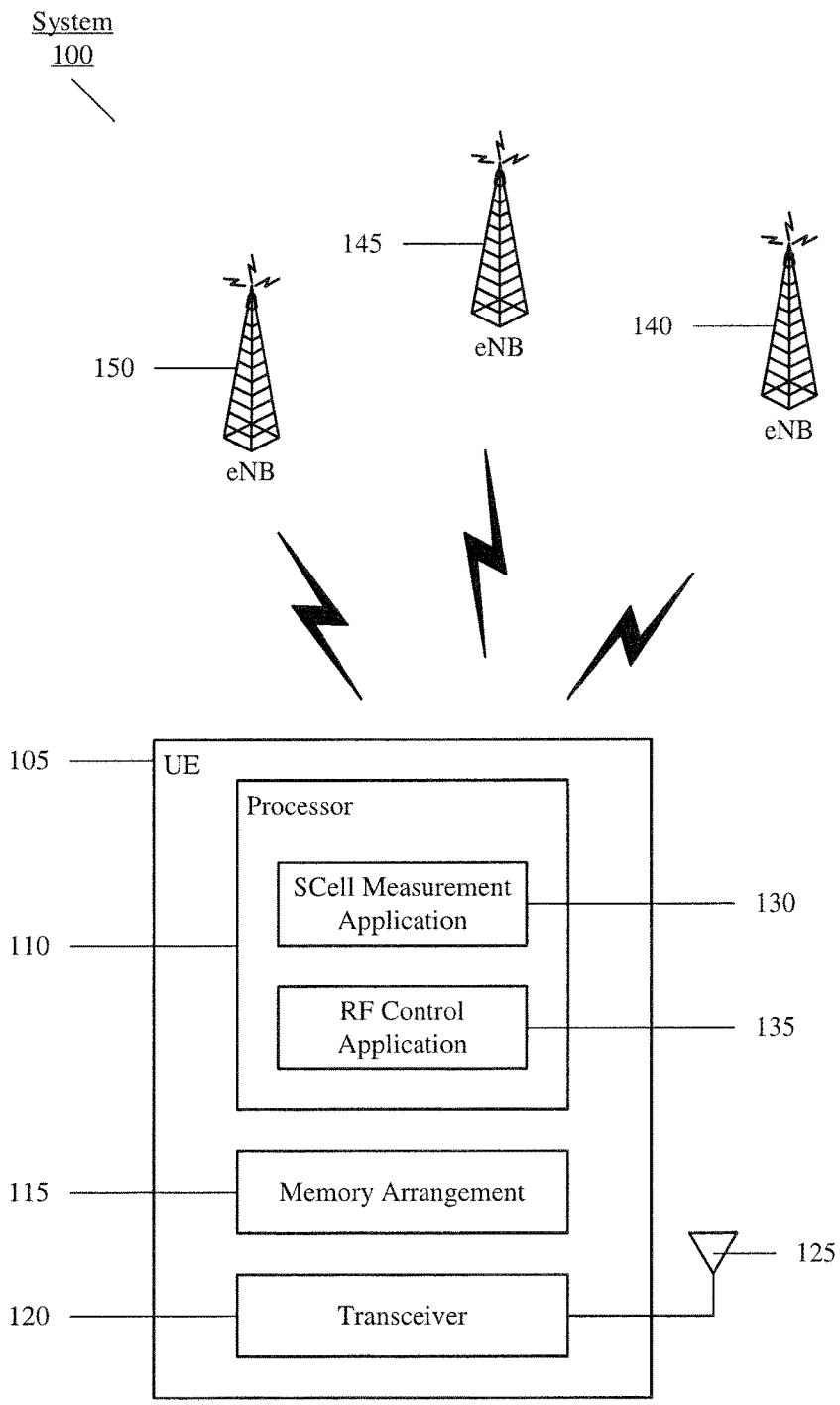
FIG. 1 shows a system where a user equipment is configured with a carrier aggregation functionality according to various embodiments described herein.

The exemplary embodiments may be further understood with reference to the following description and the related appended drawings, wherein like elements are provided with the same reference numerals. The exemplary embodiments are related to a device, system, and method for controlling a radio frequency (RF) chain of a user equipment (UE) by optimizing how measurements of a secondary serving cell (SCell) associated with a carrier aggregation (CA) functionality are performed. Specifically, the CA functionality may include a primary serving cell (PCell) and at least one SCell. The exemplary embodiments provide a mechanism where opportunities and network parameters associated with the PCell provide a basis upon which the measurements of the SCell are performed.

When the CA functionality is used, there may be a number of serving cells for each of the component carriers. The coverage of the serving cells may differ due to both component carrier frequencies and power planning, which is useful for heterogeneous network planning. A radio resource control (RRC) connection is handled by one cell, namely the PCell, served by the primary component carrier (PCC) for uplink (UL) and downlink (DL). Specifically, with a Long Term Evolution (LTE) network, the PCell may be an Evolved Node B (eNB) which is a hardware network component connected to a mobile network for communicating directly with UEs in a substantially similar manner as base transceiver stations in a Global Systems for Mobile Communications (GSM) network.

The other component carriers may be referred to as secondary component carriers (SCC) for UL and DL, serving the SCells. The SCCs are added and removed as required, while the PCC is changed at handover. That is, while a connection to the LTE network is established, the UE always has the PCC provided by the eNB to which it has associated while the SCCs may be added or removed as needed. The SCells may also be eNBs. Those skilled in the art will understand that the PCell and SCells are logical constructs allowing for the addition of SCells as needed. The PCell is the main cell that is used for all RRC signaling and control procedures, while the SCell is considered an augmentation to the PCell.

Those skilled in the art will understand that the CA functionality is controlled by the eNB serving as the PCell for the UE. For example, upon detection that the UE is CA capable and a rate of transmission to the UE is at or near a maximum possible rate of transmission (e.g., due to limitations at the PCell), the eNB may enable the CA functionality. In another example, the PCell may be fully capable of providing the maximum possible rate of transmission. Thus, the eNB may not utilize the CA functionality. In this manner, the activation or deactivation of SCells for use in the CA functionality is performed by the PCell.

However, an addition, a modification, or a release of the SCell is a functionality performed by the UE. In one example, this functionality may be performed by the RRC layer of the UE. Initially, for a specific SCell to be used in the CA functionality, the UE must first add or configure the SCell by indicating the addition to the PCell. Initially, it is noted that SCells are not added during a RRC connection establishment as no provision is included in the RRC connection setup message exchange with the PCell. Those skilled in the art will understand that the addition of SCells is performed when the access stratum (AS) security has been activated. Once the AS security operation has completed, the SCell may be added for use in the CA functionality. The addition of the SCell may be performed in a blind manner or in a controlled manner. Using the blind manner, the UE may simply discover the SCell and select to add the SCell. Using the controlled manner, the UE may perform measurements (e.g., for a network parameter such as received signal strength indicator (RSSI)) to determine whether the SCell is above a predetermined threshold. If the SCell has a satisfactory measurement, the SCell may be added. Those skilled in the art will understand that the SCell may be added to the PCell through a RRC connection reconfiguration operation (e.g., messages transmitted to the UE indicating the addition of the SCell).

When the SCell is eventually added for use in the CA functionality, the SCell is initially deactivated. That is, the SCell is in a deactivated state relative to the UE and not currently used in the CA functionality. As noted above, the activation/deactivation of the SCell is an operation performed by the PCell. Generally, the PCell may deactivate all added SCells whether or not the SCell was recently added or used in the CA functionality. When the PCell identifies a situation where the CA functionality is to be used, the PCell may activate one or more SCells.

Although the SCells may be deactivated, the UE may still perform various operations associated with the SCells. Specifically, the SCells that are available for the CA functionality may still be measured (e.g., for availability, for quality, etc.) by the UE. The measurements may be provided to the PCell so that the PCell may coordinate the CA functionality in an optimal manner. As the SCell measurements are relative to the UE, the UE may be required to perform the SCell measurements, typically in a periodic manner.

According to the exemplary embodiments, the UE may include a RF chain control functionality that toggles a status of the RF chain based upon the SCell measurements that are being performed. As the status of the RF chain used in performing the SCell measurements may impact a RF chain associated with a PCell performance, the RF chain for the SCell measurements may utilize more power than may be necessary. Accordingly, as will be described in detail below, the mechanism according to the exemplary embodiments toggles the status of the RF chain for the SCell measurements based on a SCell measurement cycle and opportunities and network parameters associated with PCell performance.

FIG. 1 shows an exemplary system 100 where a UE 105 is configured with a CA functionality. The system 100 includes the UE 105 and a plurality of eNBs 140, 145, 150. As discussed above, the UE 105 may associate with one of the eNBs 140-150 such as the eNB 140 to join the network corresponding to the eNB 140 such as a LTE network. The UE 105 and the eNBs 140-150 may also include the CA functionality that may be enabled and controlled by the eNB 140. As the UE 105 is associated with the eNB 140, the eNB 140 may provide the CA configuration for component carriers to be used by the UE 105 in which the eNB 140 may be the PCell and the eNBs 145, 150 may serve as the SCells.

It should be noted that the network shown in the system 100 is only exemplary. For example, the number of eNBs 140-150 that may be in communicative range of the UE 105 may be more or fewer than three. Those skilled in the art will also understand that there may be any number of other types of networks that may also be in communicative range of the UE 105 and that the UE 105 may also be configured to establish connections therewith. For example, the system 100 may further include a legacy radio access network, a wireless local area network, a WiFi network, etc. If configured for such a capability, the CA functionality may even be used between other types of networks. However, for exemplary purposes, the CA functionality is described herein with regard to the LTE network and the component carriers being provided by the eNBs 140-150.

The UE 105 may represent any electronic device that is configured to join a network via the eNB 130 and perform wireless functionalities. The UE 105 may be a portable device that utilizes a wireless connection such as a smartphone, a tablet, a phablet, a laptop, a wearable, etc. In another example, the UE 105 may be a client stationary device such as a desktop terminal that utilizes a wireless connection. However, the UE 105 may include a limited power supply such as a battery. The UE 105 may also operate on a variety of different frequencies or channels (i.e., range of continuous frequencies). Accordingly, the UE 105 may include components that enable different supported technologies. As shown in FIG. 1, the UE 105 may include a processor 110, a memory arrangement 115, and a transceiver 120 operating with an antenna 125. However, the UE 105 may also include further components such as a display device, an input/output (I/O) device, and other components such as a portable power supply, an audio I/O device, etc.

The processor 110 may be configured to execute a plurality of applications of the UE 105. For example, the applications may include a web browser when connected to a communication network via the transceiver 120. Accordingly, data may be exchanged with the network. More specifically, the data may be exchanged using the CA functionality to increase a rate in which the data is exchanged.

In another example, the applications may include a SCell measurement application 130 that is configured to perform measurements of the SCell. The measurements may relate to any network parameter that indicates a quality of the connection between the SCell and the UE 105. For example, the measurements may be a RSSI value. As the PCell is configured to provide the most optimal CA functionality when used, the PCell may be provided the measurements from the UE 105 regarding the various SCells that are included in the CA functionality corresponding to the UE 105. In this manner, the PCell may configure which SCells to include for use in the CA functionality as well as select the most optimal among the included SCells. For example, a first SCell may be ranked by the PCell over a second SCell for the UE 105 at a first time. At a subsequent, second time, the UE 105 may have provided measurements for the first and second SCells. However, the PCell may determine that the second SCell is more optimal than the first SCell. Thus, the PCell may rank the second SCell over the first SCell. In fact, the measurements may also be utilized by the PCell to release SCells that fall under a performance threshold.

The SCell measurement application 130 may perform the measurements of the SCell in an intermittent manner based on a cycle. For example, a timer may be used where a measurement of the SCell may be performed and the timer may be initiated. When the timer expires, a further measurement of the SCell may be performed. This process may continue for the SCell until the SCell is no longer included in the available SCells. Those skilled in the art may refer to the cycle time as "measCycleSCell." As will be described in further detail below, the exemplary embodiments may differentiate between a long cycle time and a short cycle time. Specifically, a threshold cycle time may define what constitutes a long cycle time and a short cycle time where a cycle time greater than the threshold cycle time is the long cycle time and a cycle time less than the threshold cycle time is the short cycle time. For illustrative purposes, the threshold cycle time may be 640 ms. However, the use of 640 ms is only exemplary. As will be described in further detail below, the threshold cycle time may be determined based on an interference in which the PCell performance degrades from the SCell RF chain being toggled. Thus, the threshold cycle time may change based upon a variety of different reasons (e.g., size and shape of components of the UE 105).

In a further example, the applications may include a RF control application 135 that is configured to set a status of a RF chain of the UE 105. As will be described in further detail below, the RF control application 135 may determine the manner in which SCell measurement application 130 is performing its functionality and perform PCell monitoring operations to determine the status of a SCell RF chain.

It should be noted that the above noted applications each being an application (e.g., a program) executed by the processor 110 is only exemplary. The functionality associated with the applications may also be represented as a separate incorporated component of the UE 105 or may be a modular component coupled to the UE 105, e.g., an integrated circuit with or without firmware. For example, the integrated circuit may include input circuitry to receive signals and processing circuitry to process the signals and other information. In addition, in some UEs, the functionality described for the processor 110 is split among two processors, a baseband processor and an applications processor. The exemplary embodiments may be implemented in any of these or other configurations of a UE.

The memory arrangement 115 may be a hardware component configured to store data related to operations performed by the UE 105. Specifically, the memory arrangement 115 may store information utilized by the RF control application 135 such as measurement cycle timers, network parameter thresholds, etc. The transceiver 120 may represent any component including a transmitter and a receiver to communicate with the eNB 140 and the associated network. The transceiver 120 may control how an antenna 125 operates for data to be transmitted and received. For example, the antenna 125 may be controlled to operate at a specific frequency. The antenna 125 may accordingly be a hardware component to propagate signals at the specific frequency. The antenna 125 is shown as exterior to the UE 105. However, the antenna 125 may be entirely incorporated within the UE 105 or at least partially disposed within the UE 105. The antenna 125 may also be various types including a dipole antenna configured as a primary and/or diversity antenna.

Those skilled in the art will understand that the transceiver 120 and the antenna 125 may utilize a RF chain. The RF chain may be a set of components that are powered for the functionalities to be performed. For example, in a transmitter RF chain, the components may be arranged serially with the antenna 125, an RF output component, a digital analog converter, a filter, an Inverse Fast Fourier transform (IFFT) component, a modulator, and an encoder. In another example, in a receiver RF chain, the components may be arranged serially with the antenna 125, an RF input component, an analog digital converter, a filter, an IFFT component, a modulator, and an encoder.

The transceiver 120 and the antenna 125 may be utilized for different frequencies in a constructively concurrent manner. For example, the transceiver 120 and the antenna 125 may be used to communicate on a first frequency associated with the PCell (e.g., eNB 140) with the corresponding PCell RF chain and communicate on a second frequency associated with the SCell (e.g., eNB 145) with the corresponding SCell RF chain. However, those skilled in the art will understand that powering the PCell RF chain and powering the SCell RF chain may cause interference between the two chains. Moreover, if the SCell RF chain is powered/unpowered cyclically (e.g., activated/deactivated), the PCell RF chain may suffer in its performance as compensation measures must be applied. For example, electromagnetic effects may result from power being supplied or ceased to the SCell RF chain. A sufficient length in time between the change in the power state of the SCell RF chain may provide enough time for the PCell RF chain to apply appropriate compensation measures. However, an insufficient length of time may significantly impact the PCell RF chain performance. Thus, to maintain proper PCell RF chain performance, a static state may be utilized with the SCell RF chain. As the SCell RF chain is intended to be utilized, power may be supplied to the SCell RF chain continuously, thereby achieving a constant powered state or suspended state (e.g., not an "off" or deactivated state). However, such a configuration utilizes additional power than if a deactivated state were to be utilized. As will be described in detail below, the exemplary embodiments provide a mechanism in which the deactivated state may be used by toggling the status of the SCell RF chain in a dynamic manner, particularly when measurements for the SCell are performed using a short cycle time.

Figure 2:
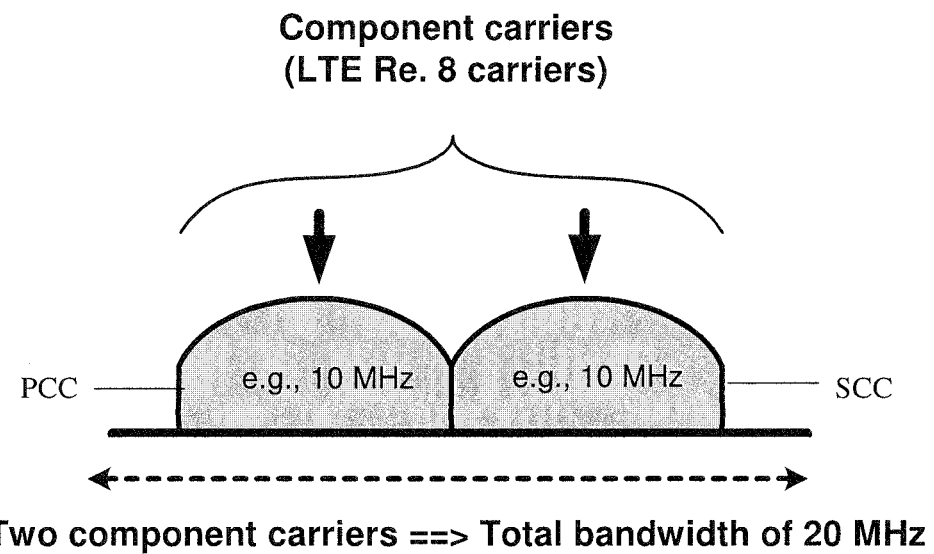
FIG. 2 shows an example of carrier aggregation.

With regard to the CA functionality, the eNB 140 may serve as the PCell while the eNBs 145, 150 may serve as at least one of the SCells. FIG. 2 shows an example of carrier aggregation. As shown in FIG. 2, the PCell may provide a first component carrier of 10 MHz representing the PCC while the SCell may provide a second component carrier of 10 MHz representing the SCC. Also shown in FIG. 2 is one type of carrier aggregation. Specifically, FIG. 2 shows the two component carriers in an intra-band carrier aggregation with continuous component carriers. However, those skilled in the art will understand that other types of carrier aggregation may also be used such as intra-band carrier aggregation with non-continuous component carriers, inter-band carrier aggregation, or any combination of these three types. Furthermore, those skilled in the art will understand that other bandwidths may be used such as 1.4, 3, 5, 15, or 20 MHz and typically a maximum of five component carriers may be aggregated. As illustrated in FIG. 2, two component carriers each having a bandwidth of 10 MHz may be combined for a total bandwidth of 20 MHz. In a specific example, with carrier aggregation features enabled, the LTE-Advanced standard device supporting 20 MHz carrier aggregation may achieve downlink ("DL") throughput of 100 Mbps (when the maximum of five component carriers are aggregated). In another example, a theoretical maximum closer to 150 Mbps may be achieved such as with only two 10+10 carriers aggregated. The eNB 140 acting as the PCell may elect to utilize the CA functionality in a manner consistent with the above description. However, it is again noted that utilizing the CA functionality requires activation of the SCell. That is, when the CA functionality is not being used or if a particular SCell that is included (e.g., added) for use by the UE 105 is not being used in the CA functionality, the SCell is monitored by the UE 105 using the SCell RF chain configured for the frequency associated with the respective SCell.

Figure 3A:
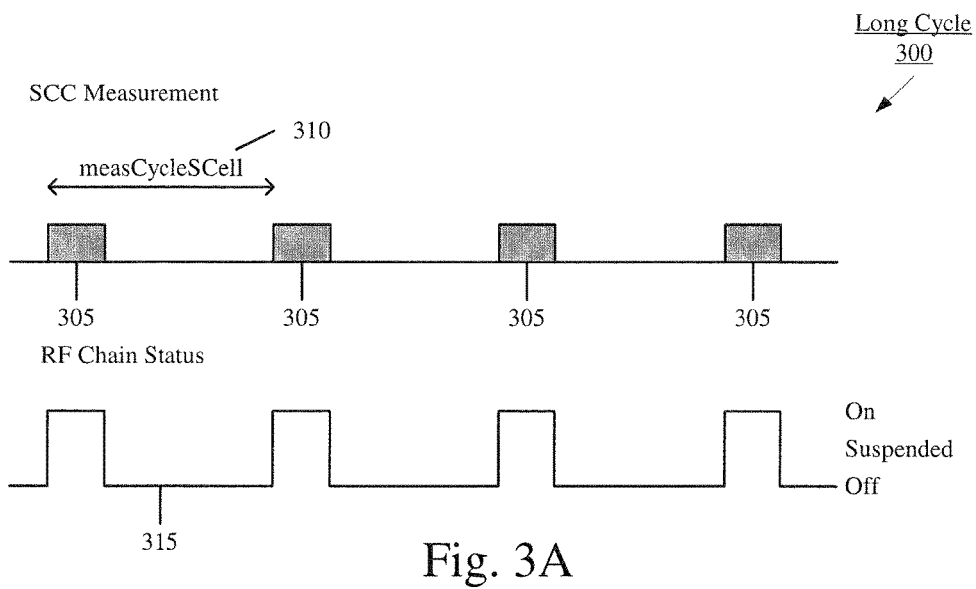
FIGS. 3A-B show cycles for measuring a serving cell according to various embodiments described herein.
Figure 3B:
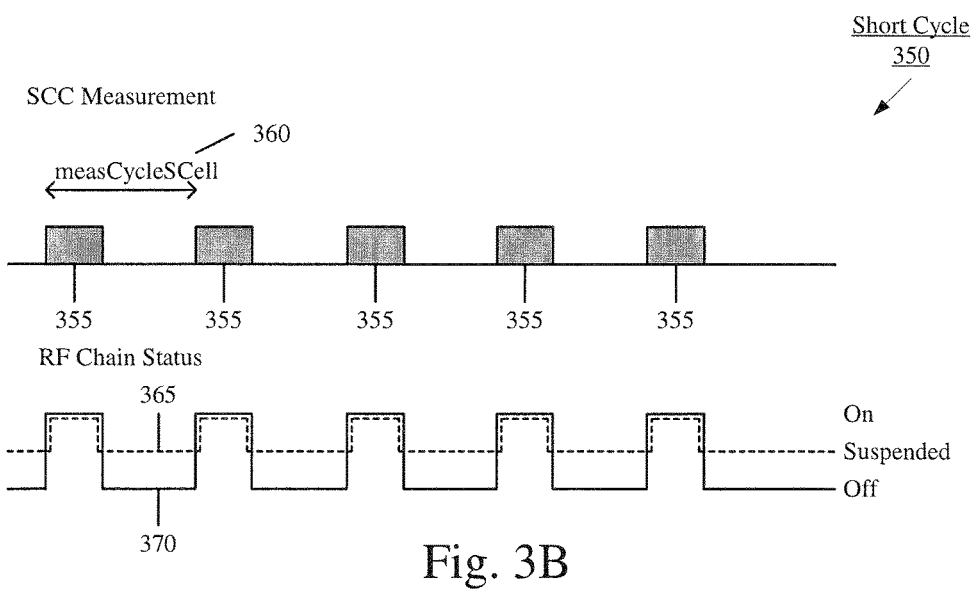

FIGS. 3A-B show cycles for measuring a SCell according to various embodiments described herein. Specifically, FIG. 3A shows a long cycle 300 for measuring the SCell while FIG. 3B shows a short cycle 350 for measuring the SCell. As described above, the long cycle 300 may have a cycle time that is greater than a threshold cycle time while the short cycle 350 may have a cycle time that is less than the threshold cycle time.

With the long cycle 300, the UE 105 may utilize the SCell RF chain to perform the SCell measurements on the frequency associated with the SCell. As illustrated, the UE 105 may perform a plurality of SCell measurements 305. The SCell measurements 305 may be performed based on a cycle time 310. As shown the measCycleSCell may be associated with the cycle time 310 which tracks a start of a SCell measurement 305 with a start of an immediately adjacent SCell measurement 305. With the long cycle 300, the cycle time 310 may be greater than a threshold cycle time (e.g., 640 ms).

As described above, the PCell RF chain of the UE 105 may experience electromagnetic interference as a result of the SCell RF chain of the UE 105 being powered. Those skilled in the art will understand that when the SCell RF chain is powered, the components in the SCell RF chain may produce electromagnetic signals. Because of the physical proximity of the PCell RF chain in the UE 105 to the SCell RF chain, these electromagnetic signals may cause electromagnetic interference with the operation of the PCell RF chain. To account for this electromagnetic interference, the PCell RF chain may implement compensation measures to return the PCell RF chain to an intended operation. However, when the SCell RF chain is off, the electromagnetic interference is not present (or it is at a different level), thus either no compensation or a different compensation may be used. The application of the compensation measures is not instantaneous because the PCell RF chain cannot react instantaneously to the change in the electromagnetic interference that results from the powering on and off of the SCell RF chain. Thus, when the SCell is in the short cycle 350, there is not enough time between on/off cycles of the SCell RF chain for the PCell RF chain to react and compensate for the different levels of interference that the PCell RF chain is experiencing. This is the reason that in current embodiments, the SCell RF chain is not powered off completely during the short cycle 350. In the long cycle 300, this is not an issue because the PCell RF chain has enough time between on/off cycles of the SCell RF chain to apply the correct compensation measures.

Based on the above discussion, it can be seen that there may be a relation between threshold cycle time of the SCell RF chain and the electromagnetic interference being experienced by the PCell RF chain. Specifically, the relation may be based on an amount of time for compensation measures to be applied to return an operation of a PCell RF chain to an intended operation. The intended operation of the PCell RF chain may relate to a variety of factors such as propagating signals at an expected frequency. This amount of time for compensation measures to be applied to return the operation of the PCell RF chain to an intended operation may be referred to as the compensation time period.

The threshold cycle time may be related to the compensation time period. In one example, the threshold cycle time may be the same as the compensation time period. In another example, the threshold cycle time may be greater than the compensation time period such that the PCell RF chain that is correctly compensated may operate for a period of time (e.g., the time difference between the threshold and the compensation time period). Those skilled in the art will appreciate that the compensation time period to which the threshold cycle time corresponds is dependent on a variety of factors, particularly with respect to the size, shape, organization, etc. of the RF chains, the components of the UE 105, etc. In this manner, the threshold cycle time may be dynamically selected based on the individual UE. The threshold cycle time may be determined under laboratory conditions and provided to the UE 105 to be stored in the memory 115. In another exemplary embodiment, the RF control application 135 may determine the threshold cycle time through experiments and previous connection information.

As illustrated in FIG. 3A, the SCell measurements 305 are performed at intervals during the long cycle 300. Thus, as the SCell RF chain is activated and deactivated for these intervals, the PCell RF chain may implement the correct compensation measures to account for the change in the state of the SCell RF chain. The long cycle 300 also shows the status of the SCell RF chain as the SCell measurements 305 are being performed. However, the long cycle 300 has a cycle time 310 that is greater than the threshold cycle time. Thus, operation in the long cycle 300 may set the status of the SCell RF chain to off or a deactivated status because the PCell RF chain has enough time to account for the changes in state of the SCell RF chain. As shown, a SCell RF chain status profile 315 is on or in an activated status during each time that the SCell measurements 305 are being performed. Between the SCell measurements 305, the SCell RF chain status profile 315 is off or in the deactivated status. Thus, power may be conserved because the SCell RF chain is only activated and drawing power when performing the SCell measurements 305.

As illustrated in FIG. 3B, the SCell measurements 355 are also performed at intervals during the short cycle 350. However, the intervals are relatively shorter than the intervals of the long cycle 300. The SCell measurements 355 may be performed based on a cycle time 360 that may be less than a threshold cycle time (e.g., 640 ms). With the cycle time 360 being insufficient for compensation measures to be properly applied for intended PCell RF chain operation, a different RF chain status profile may be used.

Using conventional approaches, when SCell measurements are not being performed, the short cycle 350 may set the status of the RF chain to suspended or an intermediary state where power is still being drawn but to a lesser degree than the on or activated status. As shown, a RF chain status profile 365 is on or in an activated status during each time that the SCell measurements 355 are being performed. Between the SCell measurements 355, the RF chain status profile 365 is in a suspended status. Thus, there are some power savings because the SCell RF chain is only fully activated and drawing a higher power when performing the SCell measurements 355, but the SCell RF chain is not completely powered off when not performing the SCell measurements.

According to the exemplary embodiments, the RF control application 135 may be configured to set the SCell RF chain to an off or deactivated status even when the cycle time is less than the threshold cycle time. Specifically, the RF control application 135 may identify interruption opportunities where electromagnetic interference from the SCell RF chain may not impact the PCell RF chain operation in a significant manner. For example, there are opportunities from the PCell perspective where the SCell transitions between a powered state and a deactivated state (and vice versa) may not cause an impact to the PCell RF chain operation.

The RF control application 135 may include a list of interruption opportunities based on a network type. For example, the UE 105 may be connected to the eNB 140 using a time division duplex (TDD) protocol or a frequency division duplex (FDD) protocol. In TDD, there may be opportunities for transitions based on the uplink/downlink configuration and a secure socket funneling (SSF) configuration. In FDD, there may be opportunities for transitions based on the downlink configuration. Specifically, the interruption opportunities on the PCell may relate to situations where there is little activity on the PCell. In this manner, the interruption opportunities may be when an activity status between the UE 105 and the PCell is less than an activity threshold. The RF control application 135 may identify various types of opportunities to utilize the mechanism according to the exemplary embodiments such as when the PCell is in a physical downlink control channel (PDCCH) only state, when the PCell has a TDD gap, when the PCell has a TDD uplink subframe with no activities scheduled, etc. Those skilled in the art will appreciate various other opportunities where there is little to no activity being performed on the PCell. The exemplary embodiments may be modified for each of these opportunities. When the opportunity is identified, the RF control application 135 may toggle the status of the SCell RF chain such that the suspended status is not used but the off or deactivated status is used instead.

Returning to the short cycle 350 of FIG. 3B, a RF chain status profile 370 illustrates how the RE control application 135 affects the manner in which the SCell RF chain power throughput is utilized. As illustrated, the RF chain status profile 370 is substantially similar to the RF chain status profile 315. That is, the SCell RF chain may be in the on or activated status whenever the SCell measurements 355 are being performed but may be in the off or deactivated status at all other times. In this manner, more power may be saved because the SCell RF chain may be deactivated even when the cycle time 360 is less than the threshold cycle time.

The RF control application 135 may also monitor network parameters associated with the PCell. Specifically, the network parameters may indicate whether the mechanism according to the exemplary embodiments is to be used. Accordingly, the opportunities described above may identify a first basis as to whether the mechanism according to the exemplary embodiments may be used. The network parameters may identify a second basis as to whether the mechanism according to the exemplary embodiments should be used. Thus, after identifying an opportunity, the RF control application 135 may monitor the network parameters such that a respective condition associated with the network parameter being satisfied may indicate that the mechanism according to the exemplary embodiments is to be used.

The network parameters may relate to any qualitative or quantitative assessment of the connection with the PCell (e.g., between the UE 105 and the eNB 140). For example, the network parameters may be a signal to noise ratio (SNR) value, a received signal received power (RSRP) value, a received signal received quality (RSRQ) value, a Doppler value, etc. Each of these network parameters may have a corresponding threshold value that must be satisfied for the network parameter condition to be satisfied. It is noted that any network parameter that is directly or indirectly associated with the connection to the PCell may be utilized. The RF control application 135 may further utilize one or more of the network parameters as the basis for using the mechanism according to the exemplary embodiments.

The functionality of the RF control application 135 may be performed at particular times. Specifically, the monitoring of the opportunity and the network parameter may be utilized before and after the SCell measurements 355. That is, prior to the start of the SCell measurement 355 and at the end of the same SCell measurement 355 may trigger the monitoring functionality of the RF control application 135 to determine whether the mechanism according to the exemplary embodiments is to be used. More particularly, the measuring of the network parameters may be performed at various times. For example, the measuring of the network parameters may coincide with the monitoring for the opportunities at the start and end of the SCell measurements. In another example, the measuring of the network parameters may be performed separately at other time periods and stored for use in a time window until the network parameters are again measured for verification.

It is noted that the above description illustrates a two-tiered approach to determine whether the mechanism according to the exemplary embodiments is used. Specifically, the two-tiered approach includes monitoring for opportunities and monitoring network parameters. However, such an approach is only exemplary. According to another exemplary embodiment, only a single approach may be used. Specifically, the monitoring for opportunities may provide the sole basis upon which the mechanism according to the exemplary embodiments is used. In this manner, the monitoring of the network parameters may provide an additional approach to further verify whether the mechanism according to the exemplary embodiments is to be used.

It is also noted that the above described scenarios with the SCells may include assumptions. For example, as described in various instances, the SCell may be included as a potential SCC that is in a deactivated state and not being used in the CA functionality. In another example, the UE 105 may not be using a disconnected reception functionality such as a continuous disconnected reception (CDRX). In a further example, the UE 105 may not have any measurement gaps such as those used with inter-frequency or inter-radio access technology (RAT) measurements.

Figure 4:
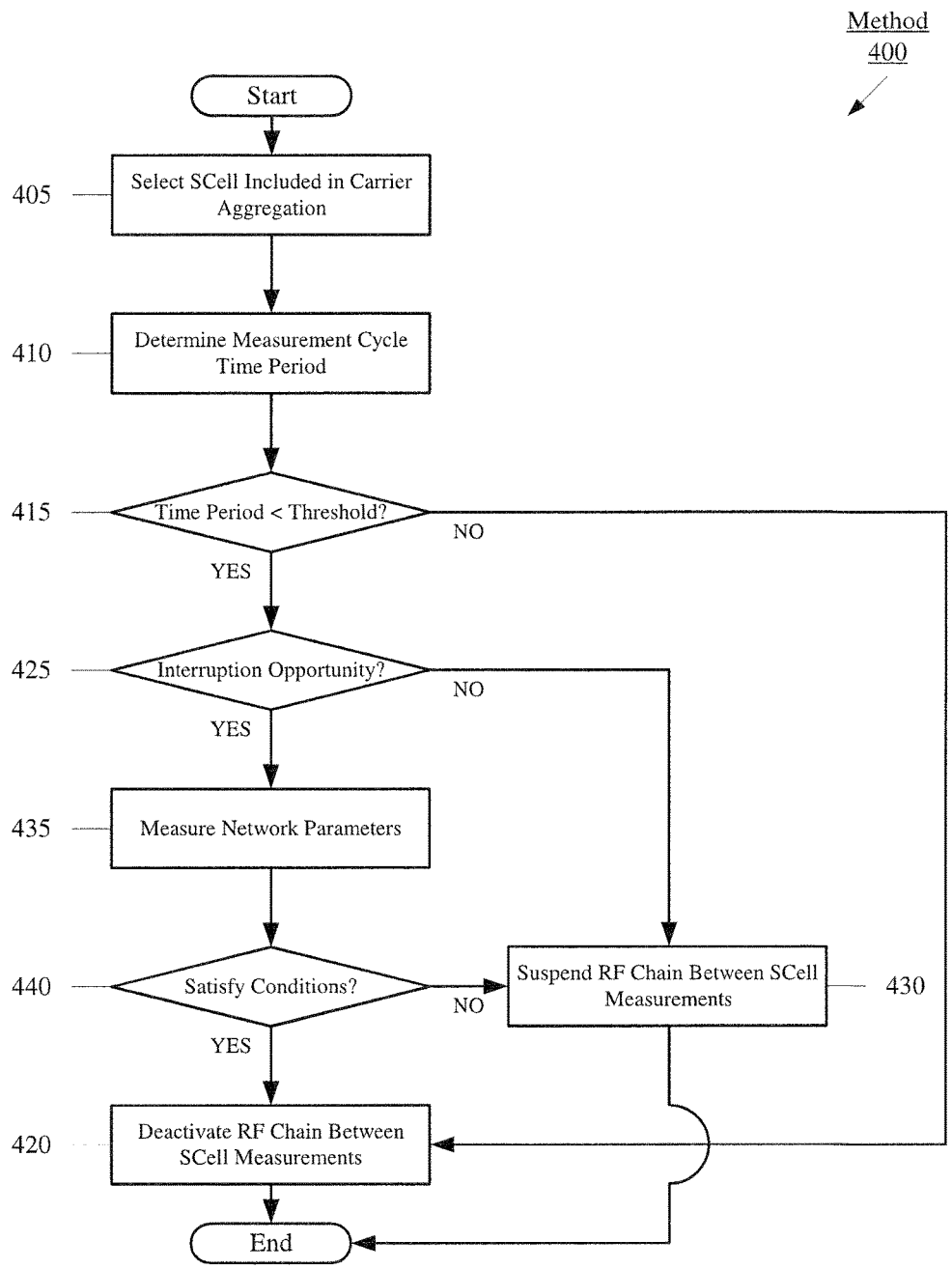
FIG. 4 shows a method for controlling a radio frequency chain while measuring a serving cell according to various embodiments described herein.

FIG. 4 shows a method 400 for controlling a SCell RF chain while measuring a serving cell. Specifically, the method 400 relates to a UE operation in which the RF control application 135 determines how a status of the SCell RF chain is to be set while the SCell measurement application 130 is being utilized to measure a deactivated SCell. It may be assumed that the UE 105 is associated with the eNB 140 and that the eNB 140 is the PCell. The method 400 will be described with regard to the system 100 of FIG. 1.

In 405, the UE 105 selects an SCell that is included in the CA functionality. As described above, the CA functionality is controlled by the PCell to which the UE 105 is connected (e.g., the eNB 140). However, the addition and release of SCells to the CA functionality as used by the PCell is performed by the UE 105. Specifically, the UE 105 may provide information and measurements regarding discovered SCells to be added or released. As there may be one or more SCells included for the CA functionality for the UE 105, the UE 105 may select one of the included SCells. Specifically, the UE 105 may select one of the included SCells that is deactivated and not being used for the CA functionality currently.

In 410, the UE 105 determines a cycle time for the SCell measurements. In 415, the UE 105 determines whether the cycle time is greater than a threshold cycle time. As described above, there may be a long cycle that has a cycle time greater than the threshold cycle time and a short cycle that has a cycle time less than the threshold cycle. The threshold cycle time may be dynamically selected to correspond to a compensation time period in which compensation measures are applied for conditions created from using the SCell RF chain, especially in an intermittent manner.

If the UE 105 determines that the cycle time is greater than the threshold cycle time (i.e., a long cycle), the UE 105 continues the method 400 to 420. In 420, the UE 105 deactivates the SCell RF chain between SCell measurements. As described above in the long cycle 300 of FIG. 3A, the cycle time 310 may be sufficient for the compensation measures to be applied effectively. Thus, the RF chain status profile 315 may be utilized in which the SCell RF chain is in the on or activated status whenever the SCell measurements 305 are being performed and in the off or deactivated status at all other times. In this manner, the power conservation may be optimized.

Returning to 415, if the UE 105 determines that the cycle time is less than the threshold cycle time (i.e., a short cycle), the UE 105 continues the method 400 to 425. In 425, the UE 105 determines whether the PCell is operating such that an interruption opportunity exists. As described above, the interruption opportunity may represent any time that the PCell is being utilized with little to no activity. For example, the PCell may be used in a PDCCH only state, a TDDP gap, a TDD uplink subframe with no activities scheduled, etc.

If the UE 105 determines that the PCell is not operating such that an interruption opportunity exists and is being used for substantial activity, the UE 105 continues the method 400 to 430. In 430, the UE 105 suspends the SCell RF chain between SCell measurements. As described above in the short cycle 350 of FIG. 3B, the cycle time 360 may be insufficient for the compensation measures to be applied effectively. Thus, the RF chain status profile 365 may be utilized in which the SCell RF chain is in the on or activated status whenever the SCell measurements 355 are being performed and in the suspended status at all other times. In this manner, at least some measure of the power conservation may be utilized.

Returning to 425, if the UE 105 determines that the PCell is operating such that an interruption opportunity exists (e.g., the PCell has little to no activity), the UE 105 continues the method 400 to 435. In 435, the UE 105 measures the network parameters. As described above, the network parameters may be any measurement indicating a quality of the connection between the UE 105 and the PCell. For example, the network parameters may be the SNR value, the RSRP value, the RSRQ value, the Doppler value, etc. Depending on the type of network parameter, in step 440, the UE 105 determines whether the quality conditions are satisfied. For example, a respective threshold must be satisfied for the given network parameter. If the condition is not satisfied, the UE 105 continues the method to 430 where the suspended status is again used. However, if the condition is satisfied, the UE 105 continues the method to 420 where the off or deactivated status is used. As described above in the short cycle 350 of FIG. 3B, the RF chain status profile 370 may be used instead.

The method 400 is described with the monitoring of the opportunity and the monitoring of the network parameters both being used to determine whether to utilize the mechanism according to the exemplary embodiments. However, as noted above, such a configuration performed by the RF control application 135 is only exemplary. That is, if the interruption opportunity is only factor, the UE 105 may bypass 435 and 440 to utilize the off or deactivated state whenever an interruption opportunity is identified.

The exemplary embodiments provide a device, system, and method to optimize power conservation when performing SCell measurements for deactivated SCells that are included for a CA functionality of a UE. As a PCell operation takes priority, a SCell RF chain associated with transmissions with the SCell may cause interference to the PCell operation. In particular, when measurements of the SCell are performed in intervals less than a threshold cycle time, the PCell operation may be interfered. However, instead of utilizing a constant suspended status for the SCell RF chain which draws power, the mechanism according to the exemplary embodiments determine opportunities and network parameters associated with the PCell to utilize an off or deactivated status instead of the suspended status such that power is not being drawn.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a user equipment (UE) that established a first connection to a first network component, the user equipment configured to establish a second connection with a second network component, the user equipment configured for a carrier aggregation functionality, the first network component serving as a primary serving cell (PCell) and the second network component serving as a secondary serving cell (SCell):
  determining a cycle comprising a first time when a SCell measurement is performed and a remainder second time, wherein a sum of the first time and the remainder second time is less than a threshold cycle time;
  identifying an interruption opportunity that occurs during the remainder second time based on activity between the UE and the PCell; and
  deactivating a radio frequency (RF) chain associated with the SCell during the remainder second time based on identifying the interruption opportunity.

2. The method of claim 1, wherein the interruption opportunity includes a physical downlink control channel (PDCCH) only state, a time division duplex (TDD) gap, a TDD uplink subframe with no activities scheduled, or a combination thereof.

3. The method of claim 1, further comprising:
  measuring a network parameter associated with the first connection to the network component.

4. The method of claim 3, wherein the network parameter is a signal to noise ratio (SNR) value, a received strength received power (RSRP) value, a received strength received quality (RSRQ) value, a Doppler value, or a combination thereof.

5. The method of claim 3, wherein the RF chain is deactivated when the network parameter satisfies a predetermined threshold.

6. The method of claim 1, further comprising:
  when the sum of the first time and the remainder second time is greater than a threshold cycle time, deactivating the RF chain associated with the SCell in the remainder second time.

7. The method of claim 1, further comprising:
  when the interruption opportunity is absent, suspending the RF chain associated with the SCell in the remainder second time.

8. The method of claim 1, wherein the threshold cycle time is determined based on a compensation time period that a PCell RF chain adapts to an intended operation state.

9. The method of claim 1, wherein the threshold cycle time is 640 ms.

10. The method of claim 1, wherein the first network component is a first evolved Node B (eNB) of a Long Term Evolution (LTE) network and the second network component is a second eNB of the LTE network.

11. A user equipment (UE), comprising:
  a transceiver configured to enable the user equipment to establish a first connection with a first network component and a second connection with a second network component, the transceiver configured for a carrier aggregation functionality, the first network component serving as a primary serving cell (PCell) and the second network component serving as a secondary serving cell (SCell); and
  a processor configured to control an operation of the transceiver by:
  determining a cycle comprising a first time when a SCell measurement is performed and a remainder second time, wherein a sum of the first time and the remainder second time is less than a threshold cycle time;
  identifying an interruption opportunity that occurs during the remainder second time based on activity between the UE and the PCell; and
  deactivating a radio frequency (RF) chain associated with the SCell during the remainder second time based on identifying the interruption opportunity.

12. The user equipment of claim 11, wherein the interruption opportunity includes a physical downlink control channel (PDCCH) only state, a time division duplex (TDD) gap, a TDD uplink subframe with no activities scheduled, or a combination thereof.

13. The user equipment of claim 11, wherein the processor is configured to control the operation of the transceiver by:
  measuring a network parameter associated with the first connection to the network component.

14. The user equipment of claim 13, wherein the network parameter is a signal to noise ratio (SNR) value, a received strength received power (RSRP) value, a received strength received quality (RSRQ) value, a Doppler value, or a combination thereof.

15. The user equipment of claim 13, wherein the RF chain is deactivated when the network parameter satisfies a predetermined threshold.

16. The user equipment of claim 11, wherein the processor is configured to control the operation of the transceiver by:
  when the sum of the first time and the remainder second time is greater than a threshold cycle time, deactivating the RF chain associated with the SCell in the remainder second time.

17. The user equipment of claim 11, wherein the processor is configured to control the operation of the transceiver by:
  when the interruption opportunity is absent, suspending the RF chain associated with the SCell in the remainder second time.

18. The user equipment of claim 11, wherein the threshold cycle time is determined based on a compensation time period that a PCell RF chain adapts to an intended operation state.

19. The user equipment of claim 11, wherein the threshold cycle time is 640 ms.

20. An integrated circuit, comprising:
  timing circuitry configured to determine a cycle comprising a first time when a secondary serving cell (SCell) measurement is performed and a remainder second time, wherein a sum the first time and the remainder second time is less than a threshold cycle time, the SCell being part of a carrier aggregation functionality with a primary serving cell (PCell), the PCell being served by a first network component, the SCell being served by a second network component; and
  processing circuitry configured to identify an interruption opportunity that occurs during the remainder second time based on activity between the integrated circuit and the PCell, and deactivate a radio frequency (RF) chain associated with the SCell during the remainder second time based on identifying the interruption opportunity.

* * * * *